United States Patent
Mitsch

(10) Patent No.: US 12,018,713 B2
(45) Date of Patent: Jun. 25, 2024

(54) WIND POWER PLANTS HAVING ELASTIC SELF-ALIGNING BALL BEARINGS

(71) Applicant: FM ENERGIE GMBH & CO.KG, Heppenheim (DE)

(72) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 1525 days.

(21) Appl. No.: 16/078,684

(22) PCT Filed: Feb. 20, 2017

(86) PCT No.: PCT/EP2017/000237
§ 371 (c)(1),
(2) Date: Aug. 22, 2018

(87) PCT Pub. No.: WO2017/144167
PCT Pub. Date: Aug. 31, 2017

(65) Prior Publication Data
US 2019/0055982 A1 Feb. 21, 2019

(30) Foreign Application Priority Data
Feb. 24, 2016 (EP) .................................. 16000441

(51) Int. Cl.
*F03D 13/20* (2016.01)
*F03D 80/00* (2016.01)
(Continued)

(52) U.S. Cl.
CPC .......... *F16C 11/0633* (2013.01); *F03D 13/20* (2016.05); *F03D 80/00* (2016.05);
(Continued)

(58) Field of Classification Search
CPC .......... F03D 13/20; F03D 13/25; F03D 80/80; F16C 11/0633; F16C 2208/10; F16C 2360/31; F16F 15/22
See application file for complete search history.

(56) References Cited

U.S. PATENT DOCUMENTS 3,025,090 A * 3/1962 Langen ............... F16C 11/0609
403/139
9,302,940 B2 4/2016 Bullerjahn et al.
(Continued)

FOREIGN PATENT DOCUMENTS

DE  1 105 738     4/1961
EP  1 008 747 A2  6/2000
(Continued)

OTHER PUBLICATIONS

English machine translation of EP 1 008 747 A2, Apr. 15, 2022.*
(Continued)

*Primary Examiner* — Sang K Kim
(74) *Attorney, Agent, or Firm* — Finch & Maloney PLLC

(57) ABSTRACT

A wind power plant which is equipped with novel elastic self-aligning ball bearings. The self-aligning ball bearings can, in principle, be used for the cardanic suspension of a pendulum absorber, preferably in a tower of a wind power plant, as well as for rope attachment of floating off-shore plants at the bottom of a body of water. Correspondingly equipped vibration pendulum absorbers per se and to corresponding installations and pendulum absorbers, which have additional damping devices, are disclosed.

12 Claims, 8 Drawing Sheets

(51) Int. Cl.
  *F03D 80/70* (2016.01)
  *F16C 11/06* (2006.01)
  *F16F 15/22* (2006.01)
(52) U.S. Cl.
  CPC .............. *F03D 80/70* (2016.05); *F16F 15/22* (2013.01); *F05B 2260/964* (2013.01); *F16C 2208/10* (2013.01); *F16C 2360/31* (2013.01); *Y02E 10/72* (2013.01)

(56) References Cited

U.S. PATENT DOCUMENTS

| | | | |
|---|---|---|---|
| 11,603,821 B2* | 3/2023 | Mitsch | F03D 80/00 |
| 2008/0296901 A1* | 12/2008 | Liu | F03D 13/25 |
| | | | 290/55 |
| 2017/0219045 A1 | 8/2017 | Glanzner | |
| 2020/0158083 A1* | 5/2020 | Nitsche | E04H 9/0215 |
| 2022/0228393 A1* | 7/2022 | Hansen | E04H 9/0215 |

FOREIGN PATENT DOCUMENTS

| | | |
|---|---|---|
| WO | 2013/023728 A2 | 2/2013 |
| WO | 2014/102016 A1 | 7/2014 |
| WO | 2016/023628 A1 | 2/2016 |

OTHER PUBLICATIONS

Machine Translation of EP 1,008,747 B1, retrieved from the Espacenet (May 20, 2023) (Year: 2023).*
International Search Corresponding to PCT/EP2017/000237 dated Jun. 28, 2017.
Written Opinion Corresponding to PCT/EP2017/000237 dated Jun. 28, 2017.

* cited by examiner

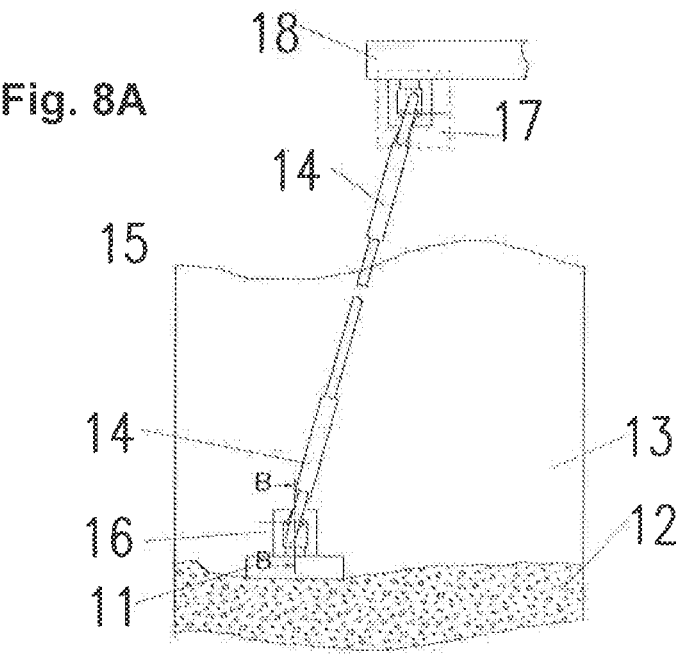
Fig. 8A
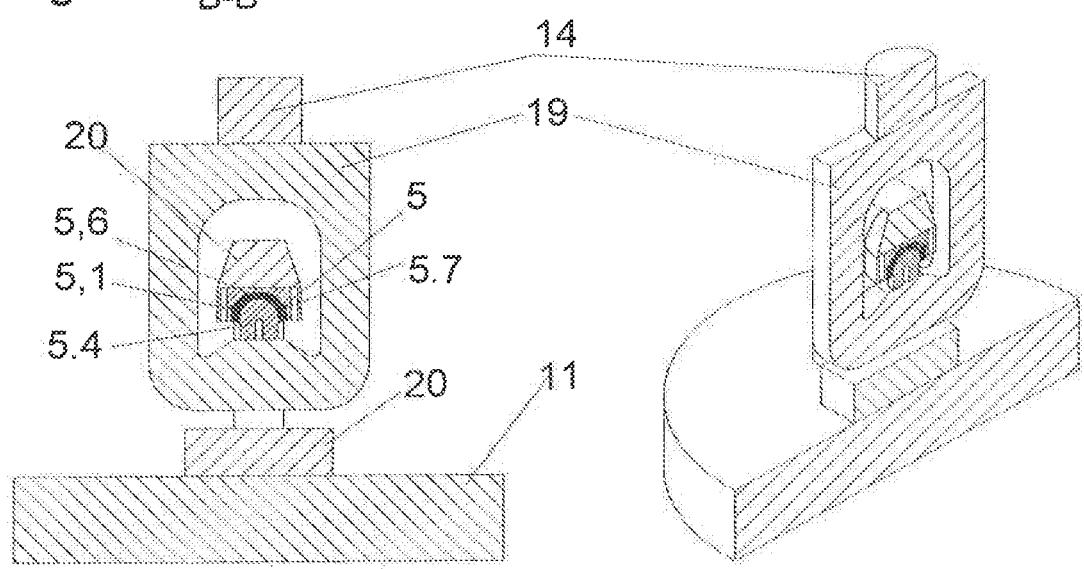
Fig. 8B B-B      Fig. 8C B-B

WIND POWER PLANTS HAVING ELASTIC SELF-ALIGNING BALL BEARINGS

This application is a National Stage completion of PCT/EP2017/000237 filed Feb. 20, 2017, which claims priority from European patent application serial no. 16000441.2 filed Feb. 24, 2016.

FIELD OF THE INVENTION

The invention relates to wind turbines which, besides the usual devices for damping various vibrations occurring in the installation, are fitted with novel elastic ball/pendulum bearings. These ball/pendulum bearings can in principle be used for cardanic suspension of a pendulum absorber, preferably in the tower of a wind turbine, and also for attachment of the cable of floating offshore installations to the bottom of a body of water. The invention also relates to the corresponding equipped vibration pendulum absorbers as such which have additional damping devices for decreasing or reducing torsional vibrations of the pendulum, which may occur during oscillation of the pendulum, for example in the wind turbine, in particular on impact of the pendulum.

BACKGROUND OF THE INVENTION

In accordance with the prior art, pendulum bearings in wind turbines are usually suspended using shackles, which, apart from the frictional forces, do not themselves make any contribution to damping of the pendulum movement. Shackles of this type, which in their simplest embodiment are U-shaped bars which can be closed by means of a threaded or unthreaded bolt, are, however, subject to considerable wear, meaning that they must be subjected to constant monitoring, since there is a risk of the pendulum cable falling off together with the absorber mass with increasing operating time.

As an alternative to the said simple suspension. Cardan joints have in the meantime also been used in the prior art, but these have the disadvantage of being relatively complex and expensive owing to their increased wear in the region of the sliding or roller bearings used.

Elastic pendulum joints have also occasionally been proposed in the prior art, but, in their known design proposals, they introduce great rigidity into the oscillation system, which is in principle undesired for use in wind turbines, so that, due to the known relatively great temperature dependence of the elastic materials, the resonant frequency of the absorber system is influenced and altered in an unforeseeable manner depending on the temperature. This in turn requires increased complex adaptation of the oscillation system.

SUMMARY OF THE INVENTION

The object was thus to provide a pendulum absorber, in particular for use in wind turbines, having a suspension or joint bearing which has improved properties in the said respect compared with the known solutions from the prior art, where importance should be attached, in particular, to high axial strength, a low restoring moment, and a highly insignificant influence on the resonant frequency of the system and thus on substantial temperature independence.

The object set has been achieved by the subject-matters of the invention specified and described below and in the claims.

The invention thus relates to a wind turbine comprising at least one elastic bearing which is a ball/pendulum bearing, which in turn comprises a ball joint (5) having an inner joint head (5.4) and a joint socket (5.5), where the joint head has an at least hemispherical shape and is mounted in the corresponding dimensioned and shaped joint socket, and at least one, preferably two or three elastomer layers (5.1) are arranged between joint head and joint socket in such a way that at least 80%, preferably 90-100% of the area of the elastomer layer is firmly connected to the spherical areas of the joint head and joint socket, and the elastomer layer has a thickness of 5 mm-20 mm, where, in the case of the presence of a plurality of elastomer layers, these are completely or partially separated from one another by intermediate metal sheets (5.3).

In a preferred embodiment of the invention, the said ball/pendulum joint or bearing has two elastomer layers which are separated from one another by a metal sheet, which is preferably interrupted in the central region of the elastomer layer (FIG. 4*d*)

It has been found that such joint heads and corresponding joint sockets which have at least a hemispherical shape, but preferably a part-spherical shape with a circle radius or wrap angle of 180° to 325°, preferably 180° to 245°, or 220° to 245°, should advantageously be employed, where if possible the entire spherical surfaces are covered with an elastomer layer. Only in the case of this design measure is the pendulum bearing able to move through large angles in a small space while accommodating large forces without the resonant frequency of the system, or of the wind turbine, being significantly influenced.

In a particular embodiment of the invention, the elastomer layer (5.1) between the spherical joint head (5.4) and the spherical joint socket (5.5) may have different stiffness, in particular with respect to the axial orientation of the pendulum and the horizontal orientation of the pendulum perpendicular thereto, or in other words with respect to the centre of the respective sphere compared with the edges. The can be achieved in accordance with the invention by two measures. On the one hand, the elastomer material can be of different stiffness at the point in question, or the regions in question, so that the deflection properties of the pendulum can be influenced thereby without the damping properties of the pendulum absorber changing significantly at the same time. Different stiffnesses can be achieved, for example, through the use of elastomer material having different Shore hardness.

On the other hand, it may be provided that the elastomer material contains specifically positioned (for example at the zenith of the joint head sphere) chambers which can be filled from the outside with a fluid under pressure via a valve (FIG. 4*b, c*). The fluid serves for the formation of a cavity and the element thereby becomes softer in the cardanic direction. The element under load does not become stiffer due to the higher pressure.

The chambers may also in principle form due to the injection of fluid in a region in which elastomer layer and metal of the joint bearing are not firmly connected to one another, or in with a region inside the elastomer layer in which elastomer material only lies on one another and can be stretched under pressure to form a chamber.

The invention furthermore relates to a corresponding wind turbine in which the ball/pendulum bearing is part of a pendulum vibration absorber which comprises a pendulum rod (2) and an absorber mass (1), where the pendulum absorber is able to move freely in all directions around the elastic ball/pendulum bearing, and preferably has a device in the region of the ball/pendulum bearing which reduces or prevents torsional vibrations of the absorber.

In a first embodiment of this type (FIGS. 1-3), the said device comprises at least one torsion lever (2.1), which is mounted essentially perpendicular to the pendulum rod (2) and has an elastic torsion bearing for pitch movements (6) and an elastic torsion bearing for rotational movements (7) of the pendulum (1, 2). For better load distribution, a plurality of such torsion levers, preferably three, may also be provided.

In a further embodiment of the invention, the device comprises at least three spring elements (8), which are distributed essentially uniformly around the pendulum rod (2) in the region of the pendulum joint (5) and are arranged in such a way that torsional movements of the pendulum (2) can be damped or prevented (FIG. 5). The spring elements here can be conventional coil springs or elastic springs comprising layers of elastomer material and intermediate metal sheets. It is furthermore also possible to use hydraulic dampers. Three such elements with spring direction are preferably arranged perpendicular to the axis of the pendulum absorber in the region of the pendulum joint, preferably around, above or below the latter, preferably in such a way that they form a 120° angle to one another. In this way, the spring forces acting are able to prevent or reduce torsion of the pendulum absorber by the latter striking the tower wall or a stop device provided for this purpose.

Essentially the same effect is achieved by the further embodiment according to the invention of FIG. 6, which is arranged in a similar manner. In this case, use is made of a device in this respect which has at least three connecting rods (9) with elastic spherical bearings (9.1)(9.2), which are distributed essentially uniformly around the pendulum rod (2) in the region of the pendulum joint (5) and are arranged in such a way that torsional movements of the pendulum (2) are damped or prevented. The connecting rods (9) can be realised, for example, as depicted in FIG. 6, by roller elements.

In a very specific simple embodiment of the invention, the device for damping torsional movements of the pendulum comprises a pendulum yoke (2.2)(2.3) having elastic stop elements (10) in the region of the pendulum joint (5), as depicted, for example, in FIG. 7.

In further embodiment of the invention, the said devices for damping the torsional movement of the pendulum can be formed by combinations of the said embodiments. In particular, the use of a pendulum yoke can be combined with a spring device or a connecting rod device.

The described pendulum joints according to the invention are also eminently suitable for use in offshore platforms of various use, for example wind turbines or oil rigs for movable attachment of the platform to the sea bed. The invention thus also relates to an offshore platform (18), in particular for wind turbines, which is anchored via cables (15) to the sea or ocean bed (12) via foundations (11), with each cable (15) being attached, by means of cable attachments (14), to the platform via a said upper ball joint (17) according to the invention and to the foundation via a said lower ball joint (16) according to the invention. An application of this type is depicted in FIG. 8.

The invention also relates to a corresponding pendulum vibration absorber, comprising a pendulum rod (2) or pendulum cable, at least one absorber mass (1) and an elastic ball joint (5) at the upper end of the pendulum rod/pendulum cable, where (i) the ball joint (5) is fitted with an inner joint head (5.4) and a joint socket (5.5), (ii) the joint head has an at least hemispherical shape and is mounted in the corresponding dimensioned and shaped joint socket, (iii) at least one, preferably two, elastomer layers (5.1) separated by a metal sheet is/are arranged between joint head and joint socket, so that the pendulum is able to move freely in all directions around the elastic ball/pendulum bearing, (iv) the joint head (5.4) connected to the elastomer layer and the corresponding joint socket (5.5) have a part-spherical shape with a circle radius or wrap angle of 180° to 325°, preferably greater than 220°, in particular greater than 245°, but not greater than 325°, and (v) a device which reduces or prevents axial torsional vibrations of the pendulum is installed in the region of the ball joint (5), where the device additionally comprises at least one torsion lever (2.1) which is installed essentially perpendicular to the pendulum rod (2) and has an elastic torsion bearing for pitch movements (6) and an elastic torsion bearing for axial rotational movements (7) of the pendulum (1, 2), or has at least three spring elements (8) which are distributed essentially uniformly around the pendulum rod (2) in the region of the pendulum joint (5) and are arranged in such a way that torsional movements of the pendulum (2) are damped or prevented, or has at least three connecting rods (9) with elastic spherical bearings (9.1, 9.2) which are distributed essentially uniformly around the pendulum rod (2) in the region of the pendulum joint (5) and are arranged in such a way that torsional movements of the pendulum (2) are damped or prevented, or has a pendulum yoke (2.2)(2.3) having elastic stop elements (10) in the region of the pendulum joint (5) and is arranged in such a way that torsional pendulum movements are damped or prevented, or comprises combinations of the device elements from (ii) to (iv), in particular (ii) and (iv), or (iii) and (iv).

Finally, the invention also relates to wind turbines and pendulum vibration absorbers which, apart from the torsion damping elements described, additionally have damping elements which are capable of damping the various vibrations occurring in the installation. These can be prior-art eddy current dampers, hydraulic dampers or other temperature-independent dampers (e.g. WO 2013/023728, WO 2014/102016, WO 2016/023628).

BRIEF DESCRIPTION OF THE DRAWINGS

The reference numerals used in the figures, in the text and in the claims are described briefly below:

Further details of the invention are described below, in particular with reference to FIGS. 1-10:

FIGS. 8A, 8B, 8C and 9 show different applications for the elastic ball/pendulum bearings for connection and attachment to an offshore platform, such as a wind turbine or some other floating installation.

DETAILED DESCRIPTION OF THE PREFERRED EMBODIMENTS

The absorber system described has a low restoration moment at the same time as high axial strength, so that the influence of the elastomer on the resonant frequency has only a very insignificant influence on the resonant frequency of the system and thus the temperature dependence also becomes negligibly small.

This property is achieved by one or more hemispherical elastomer layers stacked one above the other. Owing to the large sphere envelope surface area and the particularly thin layers, high axial stiffnesses are thus achieved, which enables the transmission of correspondingly large axial forces.

Figure 10:
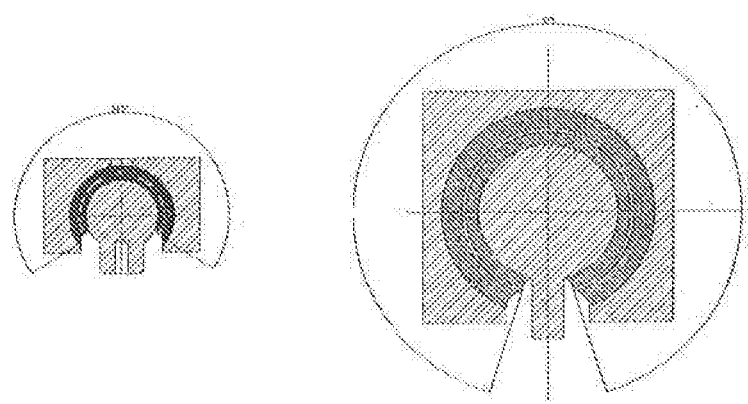
FIG. 10 shows an arrangement where the axial stiffness to the torsional stiffness increases with an increasing wrap angle.

The ratio of the axial stiffness to the torsional stiffness increases with increasing wrap angle, which is why wrap angles of the ball elements of greater than 220°, in particular between 220° and 325°, or 220° and 245° are particularly suitable. An embodiment of this type is depicted in FIG. 10. Ball elements having an angle up to about 225° can still be manufactured as a single part. In the case of larger wrap angles, they are generally composed of two or more parts. The elastomer layer is pulled as far as possible around the ball radius in order to keep the ratio of free rubber surface to metal-bonded rubber surface as small as possible. Depending on the requirements of the possible rotation angle, as many elastomer layers as desired can be connected one behind the other.

Figure 4A:
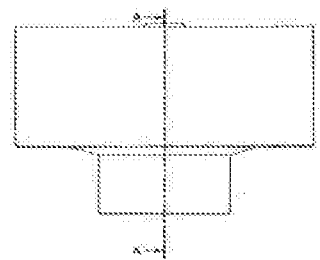
FIGS. 4A, 4B, 4C and 4D show arrangements where the cardanic stiffness can be reduced further through the use of a fluid.
Figure 4B:
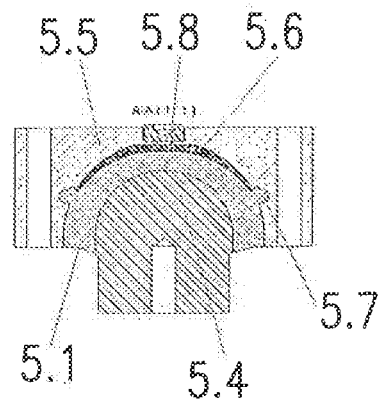
Figure 4C:
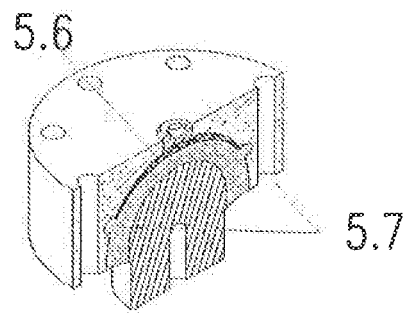
Figure 4D:
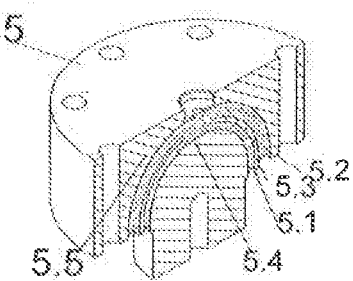
Figure 5A:
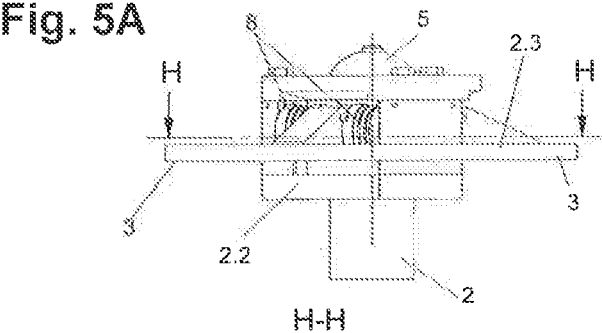
FIGS. 5A, 5B, 5C, 5D and 5E are respectively front, cross-sectional, bottom, cross-sectional, top, and cross-sectional views of spring elements employed as an alternative to the one or more torsion levers.
Figure 5B:
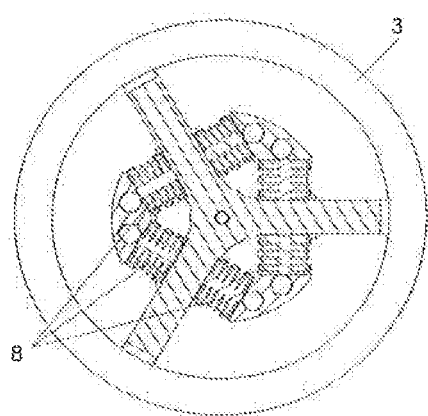
Figure 5C:
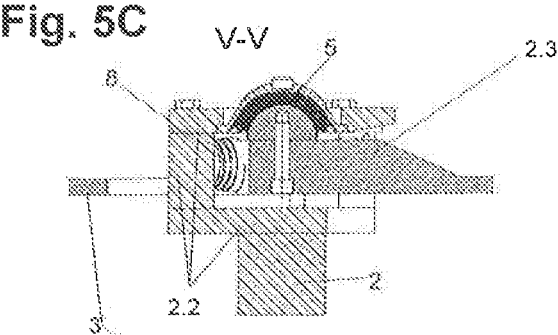
Figure 5D:
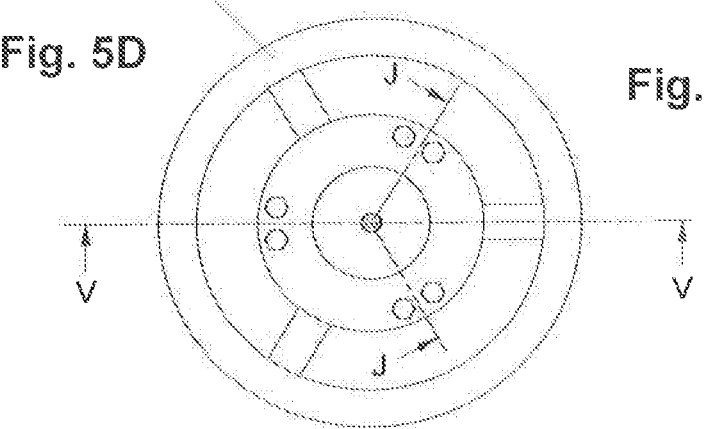
Figure 5E:
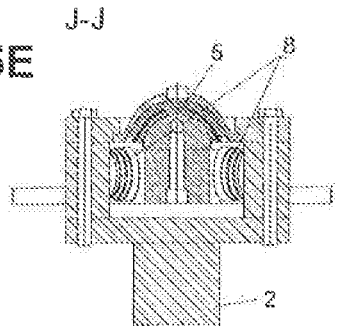

The cardanic stiffness of the absorber can be reduced further by introduction of a fluid (5.6), since no elastomer deformation takes place in the region of the fluid. The elastomer deformation only takes place in the region outside the fluid, so that only a relatively small elastomer region is deformed, which causes lower push forces and thus lower cardanic forces. As depicted in FIG. 4b, a sealing bead (5.7) prevents the ingress of the fluid into the space between metal and elastomer. As generally known, liquid tends to accumulate in the rubber-metal bond in the form of extremely small droplets when the pressure is released and penetrate deeper into the bond during the next loading, meaning that the liquid may escape in the case of frequent loading. This can be prevented, for example, by employing a thick liquid, for example viscous silicone, instead of water.

Figure 2A:
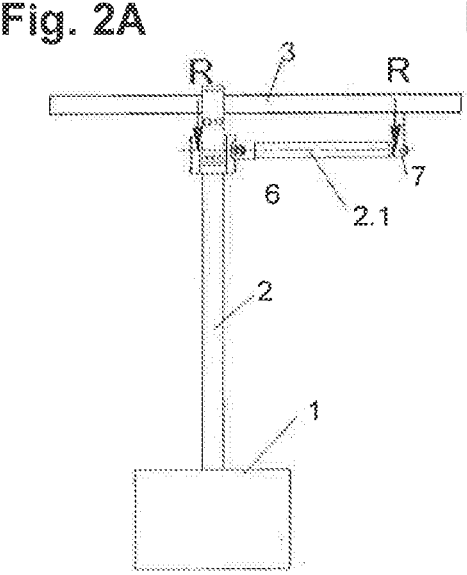
FIGS. 2A, 2B and 2C are respectively front, left side and top views of the pendulum absorber of FIG. 1.
Figure 2B:
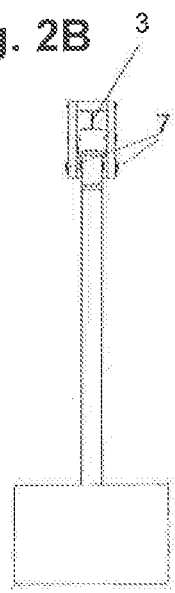
Figure 2C:
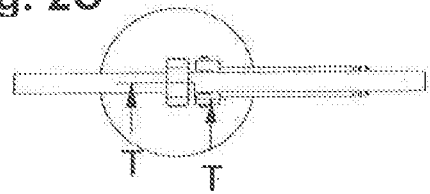
Figure 3A:
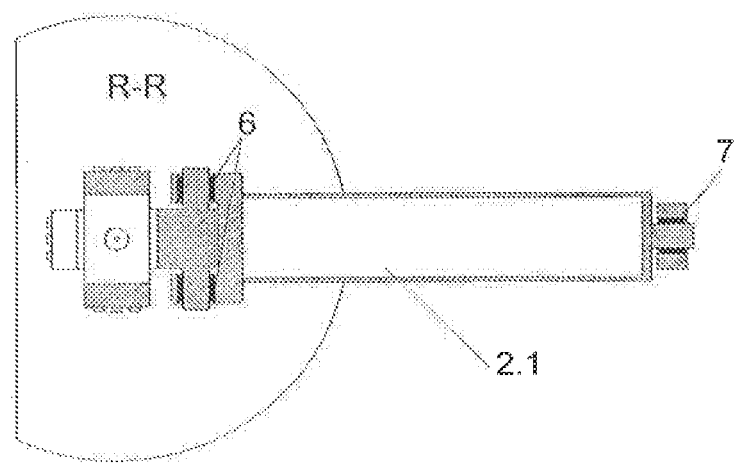
FIGS. 3A, 3B and 3C are respectively top, front and perspective views of semi-ball joint and the pitch torsion bearing of FIG. 1.
Figure 3B:
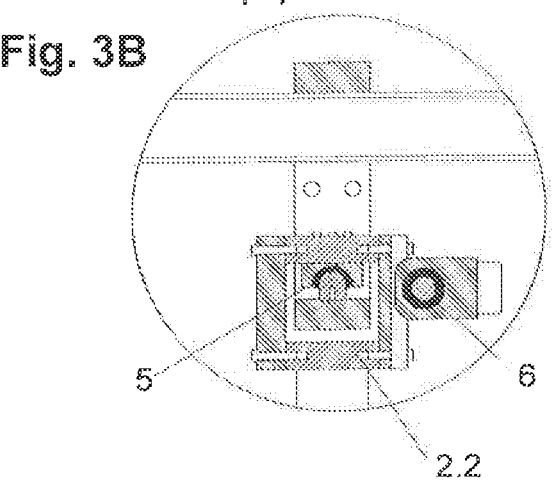
Figure 3C:
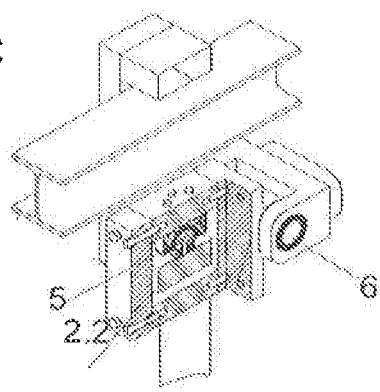

A conventional pendulum absorber usually has an absorber mass which strikes the wall of the tower of the wind turbine via a stop system. In this case, it may occur that the absorber strikes the curvature tangentially and thus experiences a relatively large torsion moment. This torsion moment is transmitted to the ball joint via the pendulum rod. However, the ball joint has only low torsional stiffness, meaning that it is necessary to absorb this by means of a further construction. The angle of rotation of the absorber must not be too great here in order not to stress the connection to the dampers. The solution according to the invention is depicted in FIGS. 1 to 3.

Figure 1:
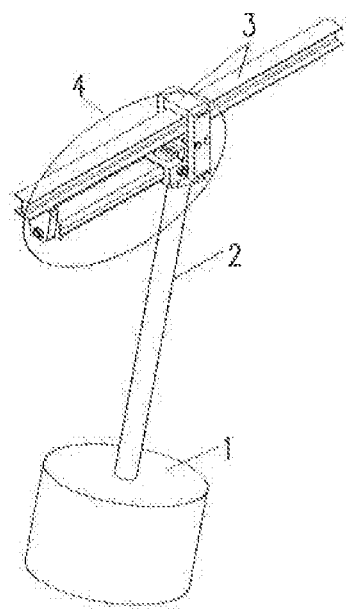
FIG. 1 is a perspective view which shows a pendulum absorber consisting of an absorber mass, a pendulum rod, an attachment construction and a pendulum element with a rotation inhibition.

FIG. 1 shows a pendulum absorber consisting of the absorber mass (1), the pendulum rod (2), an attachment construction (3) and the pendulum element with rotation inhibition (4). The moment is transmitted via the torsion lever (2.1). The torsion lever is connected to the pendulum yoke (2.2) in an articulated manner. The point of rotation of this connection is advantageously at the same height as the point of rotation of the ball/pendulum bearing. This connection can be established, for example, in the form of sliding bearings. Elastomer bushes (6) are preferably used here. The end of the torsion lever merges into a rotation torsion bearing (7), which is arranged perpendicular to the pitch torsion bearings (6). This bearing is in the form of an elastomer bearing in order that it is able to transmit both a torsion load and also a cardanic load. It is possible to design the system, as depicted, with a torsion lever (2.1). In order to enable better load distribution, two or more, preferably three, such levers may also be provided on the periphery.

Figure 6:
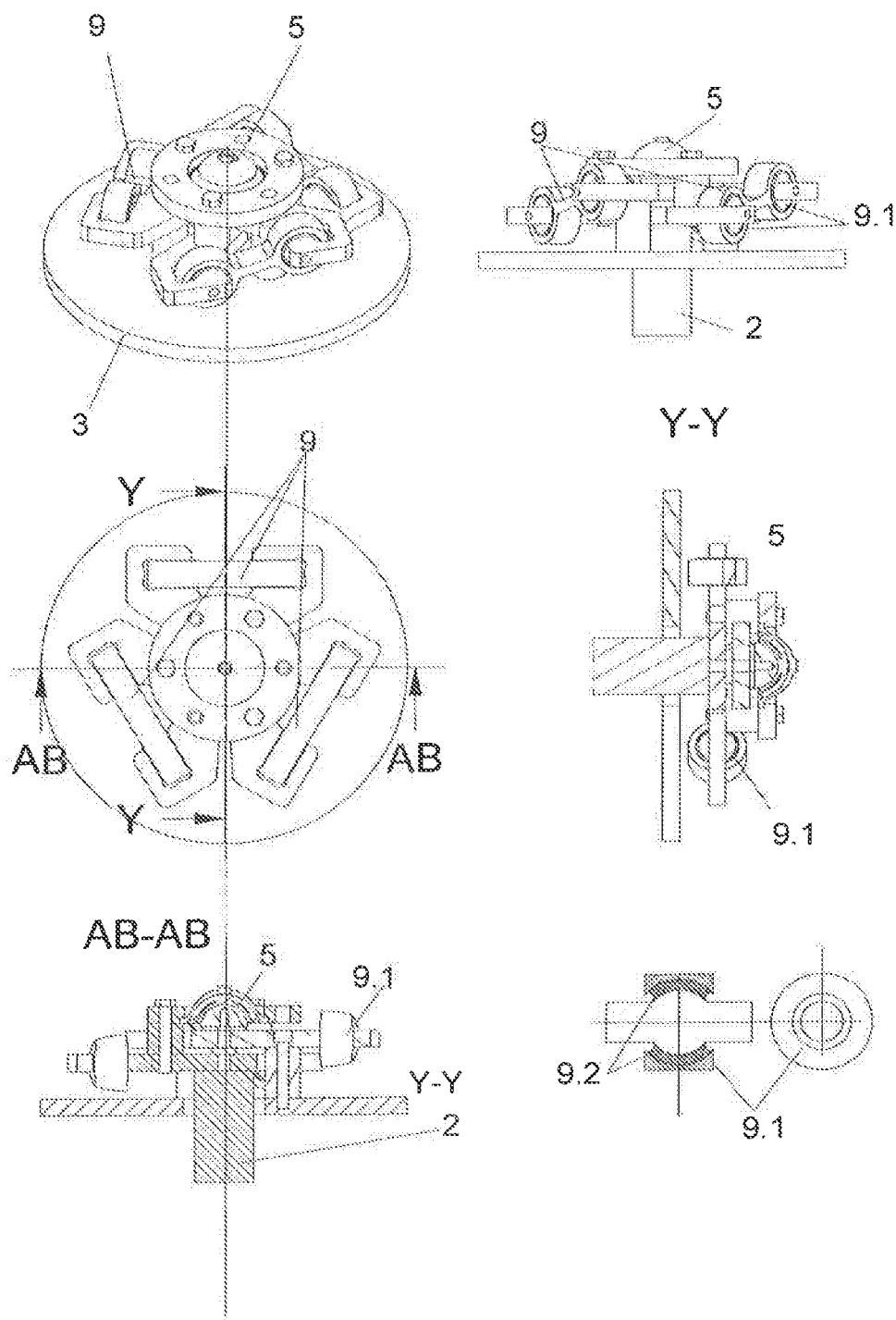
FIG. 6 shows it is possible to employ elastic elements as an alternative to the one or more torsion levers.

As an alternative to one or more torsion levers, as described, it is also possible to employ spring elements or elastic elements, as shown in FIG. 5 and FIG. 6. The semi-ball joint (5) of FIG. 5 is constructed here as described above. In order to absorb the torsional impacts, a plurality of tangentially arranged multilayered torsion spring elements (8) are installed in the region of the joint. These connect the pendulum yoke (2.2) to the upper attachment (2.3). Detonation spring elements (8) thus establish an elastic connection to the elements (2.2) and (2.3). This connection is soft in the pendulum direction owing to the low shear stiffness of multilayered elements of this type. Owing to the relatively high axial stiffness of the multilayered torsion spring elements, there is high stiffness in the torsion direction between (2.2) and (2.3). The system of FIG. 6 has a similar construction to the embodiment in accordance with FIG. 5. However, the upper attachment (2.3) is connected to the pendulum yoke (2.2) by connecting rods (9). This likewise gives rise to a torsionally stiff and cardanically soft connection between pendulum yoke (2.2) and the upper attachment (2.3). The connecting rods (9) consist, for example, of two elastomer spherical bearings (9.1) or roller elements, which are known per se in the prior art. These have the property of being radially stiff and relatively soft in the cardanic direction.

Figure 7:
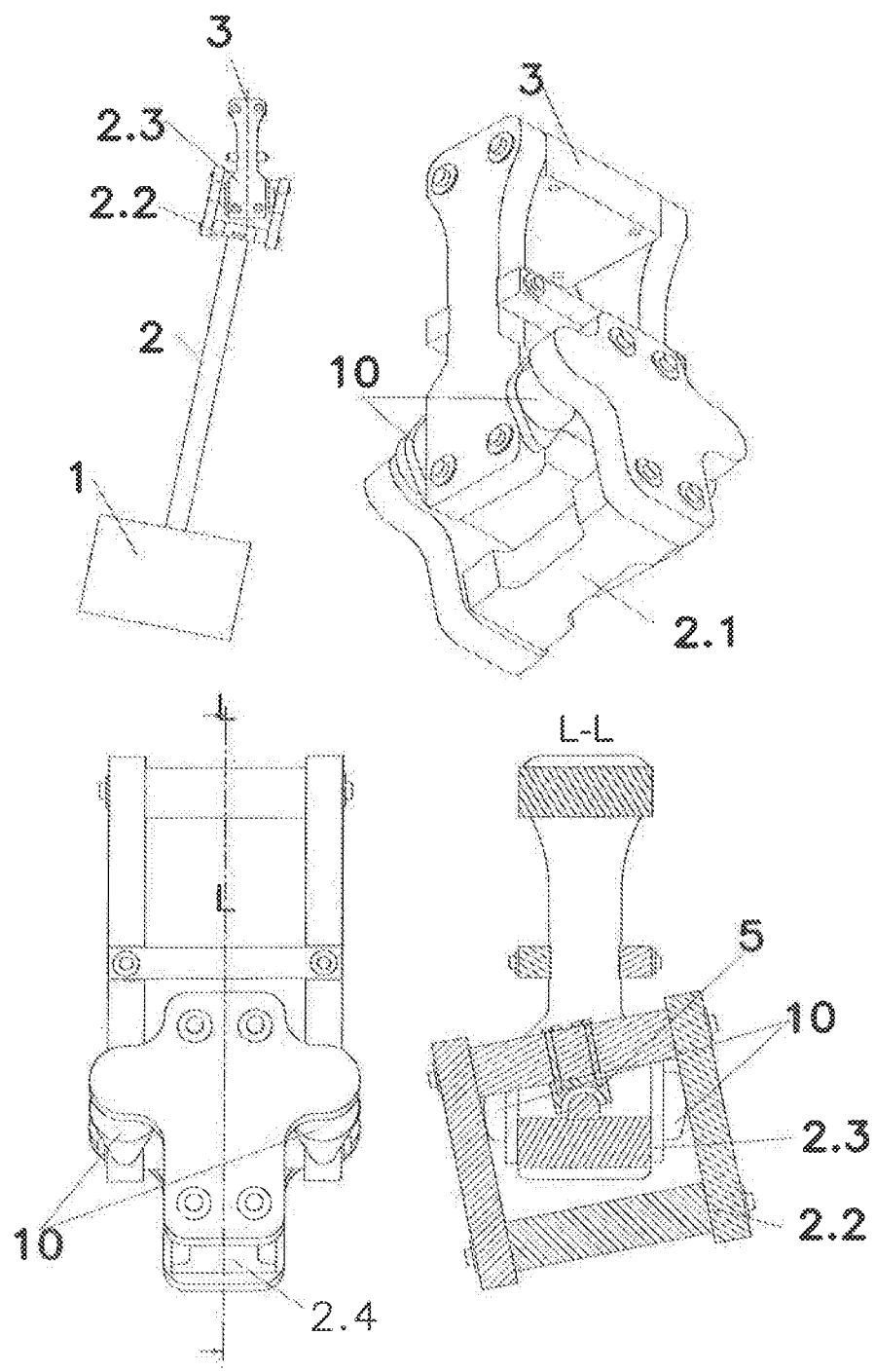
FIG. 7 is a semi-ball joint and a pendulum yoke with an upper attachment.

The embodiment in accordance with FIG. 7 essentially consists of a semi-ball joint (5), the pendulum yoke (2.2) with the upper attachment (2.3). The torsion forces occurring due to the tangential striking of the absorber are transmitted via stop buffers (10).

Figure 9:
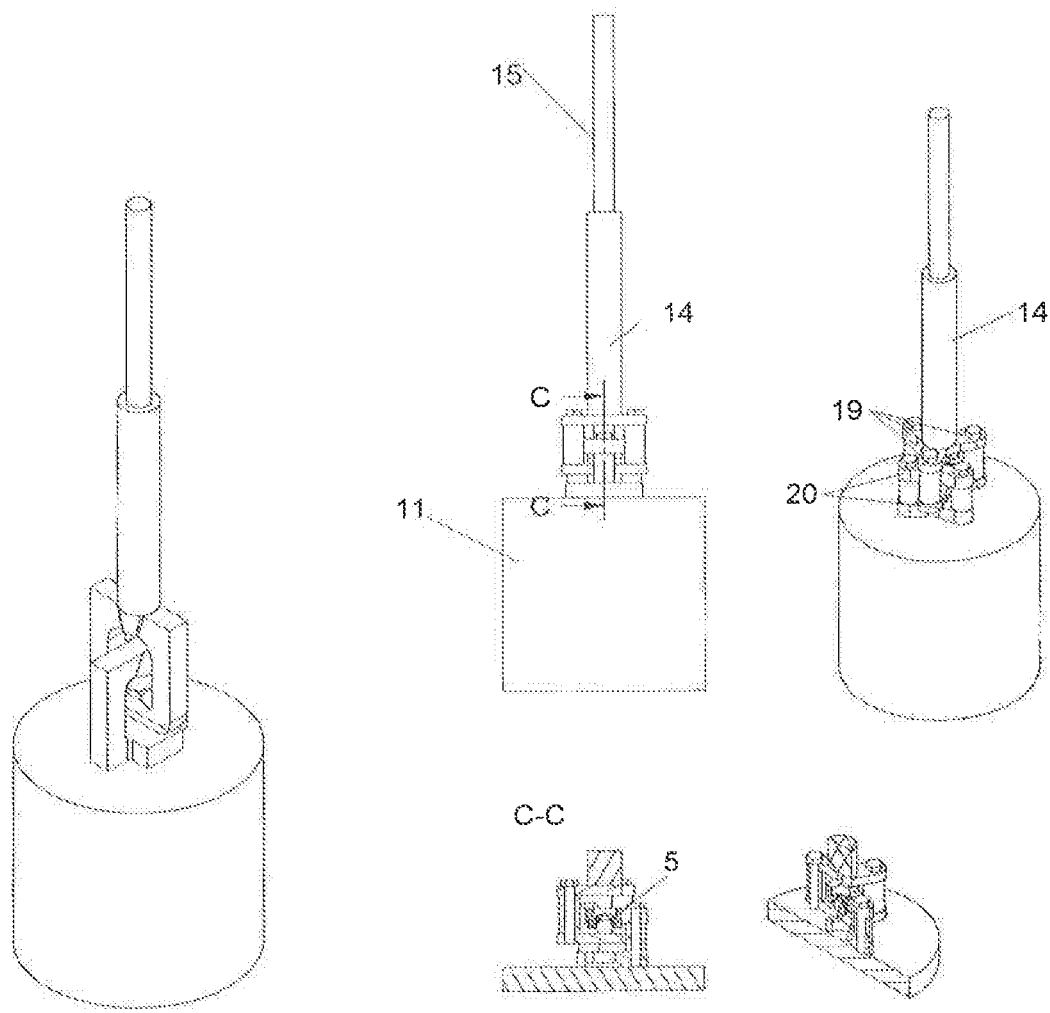

A completely different application for the elastic ball/pendulum bearings is the connection and attachment of offshore platforms, in particular in connection with wind turbines or possibly other floating installations (FIG. 8. FIG. 9). The bearing can thus be employed both for offshore platforms as such and for offshore platforms with wind turbines in particular. When attaching the cables of offshore foundations, the problem exists that the cables kink at the fixing site owing to cardanic movement. This can be remedied by the use of commercially available shackles. However, these are subject to considerable wear owing to the friction arising between the individual elements, meaning that they are only serviceable for a limited period. On use of the elastomer ball/pendulum bearing according to the invention, the transition takes place in a friction-free manner. The elements are maintenance-free over a long period. An elastomer ball/pendulum bearing (5) having one or more hemispherical elastomer layers is also used here. These are positioned between the movable yoke (19) and the fixed yoke (20). The cable attachment (14) (FIG. 9) is installed on the respective movable yoke (20). Owing to the low cardanic stiffness of the elastomer elements, the cable is only subjected to low flexural moments. The kink loading on the cable is low. Elements of this type in accordance with the invention are able to transmit loads of greater than 1000 kN, even with a diameter of about 200 mm, at the same time as low cardanic stiffness. The cardanic stiffness can be reduced further here through the use of a fluid (56) in accordance with an arrangement as shown in FIG. 4b,c. If two elastomer layers are used, a fluid cushion can also be introduced on the inner ball, enabling the cardanic stiffness to be reduced further on the one hand through a plurality of layers and at the same time through the use of the fluid cushion. In order to facilitate even greater angles with a low restoration force, a plurality of joints can be connected one behind the other. For this purpose, it is sensible to design the elements that are further from the foundation or platform to be softer in the direction of the cable than the elements of the fixing site. In the case of correspondingly soft connection points, the cable technology can be omitted entirely. The cables can be replaced by a succession of several joints with rigid elements connected in between.

The elastomer layers in the ball/pendulum bearings according to the invention can have different thicknesses, which, however, vary predominantly between 5 mm and 20 mm. If two layers are used, the inner layer advantageously has only about 50-70% of the thickness of the outer layer, which is vulcanised to the joint socket. An elastic inner layer has a thickness of between 4.5 and 9 mm, whereas an elastic outer layer can have a thickness of between 6 and 12 mm. The Shore hardnesses of the elastomers used in the ball/pendulum bearings according to the invention can be between 50 and 100 Shore A.

1 absorber mass
2 pendulum rod
2.1 torsion lever
2.2 pendulum yoke
2.3 upper attachment
2.4 pendulum rod connection
3 attachment construction
4 pendulum element with rotation inhibition
5 semi-ball joint
5.1 inner elastomer layer
5.2 outer elastomer layer
5.3 intermediate metal sheet
5.4 inner ball
5.5 outer ball
5.6 fluid
5.7 sealing bead
5.8 filling valve
6 pitch torsion bearing
7 rotation torsion bearing
8 torsion spring element
9 connecting rod
9.1 spherical bearing in connecting rod
9.1.1 spherical elastomer track
10 stop buffer
11 foundation anchor
12 sea bed
13 water
14 cable attachment
15 cable
16 joint lower
17 joint upper
18 offshore platform
19 movable yoke
20 fixed yoke

The invention claimed is:

1. A wind turbine comprising:
   at least one elastic bearing,
   wherein the elastic bearing is a ball/pendulum bearing which comprises a bearing ball joint (5) having an inner joint head (5.4) and a joint socket (5.5),
   the joint head has an at least hemispherical shape and is mounted in the joint socket, which is correspondingly dimensioned and shaped,
   at least one elastomer layer (5.1) is arranged, between the joint head and the joint socket, in such a way that at least 80% of an area of the at least one elastomer layer is firmly connected to spherical areas of the joint head and the joint socket,
   the at least one elastomer layer has a thickness of 5 mm-20 mm, and
   the joint head (5.4), covered by the at least one elastomer layer and the corresponding joint socket (5.5), have a part-spherical shape with a wrap angle of 180° to 325°,
   wherein the ball/pendulum bearing is part of a pendulum vibration absorber, which comprises a pendulum rod (2) or a pendulum cable (14) and an absorber mass (1), and the pendulum absorber is able to move freely in all directions around the elastic ball/pendulum bearing, and
   wherein the at least one elastomer layer comprises at least two elastomer layers (5.1, 5.2) that are at least partially separated from one another by one or more intermediate metal sheets (5.3).

2. The wind turbine according to claim 1, wherein the ball/pendulum bearing has regions between at least one elastomer layer (5.1) and the joint head (5.4) and/or the joint socket (5.5) or within the at least one elastomer layer (5.1) which allow a fluid (5.6) to be injected into these regions, via a filling valve, so that consequently locally different torsional stiffnesses exist with constant axial stiffnesses.

3. The wind turbine according to claim 1, wherein the at least one elastomer layer (5.1), between the joint head and joint socket, has a different stiffness in an axial direction of the ball/pendulum bearing than in an horizontal direction.

4. The wind turbine according to claim 1, wherein the pendulum vibration absorber has a device, in a region of the ball/pendulum bearing, which reduces or prevents torsional vibrations of the absorber.

5. The wind turbine according to claim 4, wherein the device comprises at least one torsion lever (2.1) which is mounted perpendicular to the pendulum rod (2) or the pendulum cable (14) and has a pitch elastic torsion bearing for pitch movements (6) and a rotational elastic torsion bearing for rotational movement (7) of the pendulum rod (1, 2).

6. The wind turbine according to claim 4, wherein the device has a pendulum yoke (2.2) (2.3) which has elastic stop elements (10) in a region of a pendulum joint or the pendulum cable (14) and is arranged, in such a way, that torsional pendulum movements are damped or prevented.

7. The wind turbine according to claim 4, wherein the device has at least three spring elements (8) which are distributed uniformly around the pendulum rod (2) or the pendulum cable (14), in a region of a pendulum joint, and are arranged in such a way that torsional movements of the pendulum rod are damped or prevented.

8. The wind turbine according to claim 4, wherein the device has at least three connecting rods (9) having elastic spherical bearings (9.1, 9.2) which are distributed uniformly around the pendulum rod (2) or the pendulum cable (14), in a region of a pendulum joint, and are arranged in such a way that torsional movements of the pendulum rod are damped or prevented.

9. The wind turbine according to claim 1, wherein the wind turbine has at least one additional device for damping vibrations occurring in the installation, and the at least one additional device is one of a hydraulic damper, an eddy current damper and a mechanical temperature-independent damper.

10. The wind turbine according to claim 1, wherein the wind turbine is an offshore platform (18) which is anchored, via cables (15), to a sea or an ocean bed (12) via foundations (11), and each of the cables (15) is attached, by cable attachments (14), to the offshore platform, via an upper ball joint (17), and to the foundation, via a lower ball joint (16).

11. A pendulum vibration absorber for damping vibration in a tall slim structure, the pendulum vibration absorber comprising:
   a pendulum rod (2) or a pendulum cable (14),
   at least one absorber mass (1), and
   an elastic ball joint (5) at an upper end of the pendulum rod or the pendulum cable,
   wherein
   (i) the elastic ball joint (5) is fitted with an inner joint head (5.4) and a joint socket (5.5), the joint head has an at least hemispherical shape and is mounted in the joint socket which is correspondingly dimensioned and shaped, at least one elastomer layer (5.1), which has a thickness of 5 mm-20 mm, is arranged between the joint head and the joint socket in such a way that the pendulum rod or the pendulum cable is able to move freely in all directions around the elastic ball/pendulum bearing, and the joint head (5.4) connected to the at least one elastomer layer and the corresponding joint socket (5.5) have a part-spherical shape with a wrap angle of 180° to 325°, and
   (ii) a device which reduces or prevents axial torsional vibrations of the pendulum rod or the pendulum cable is installed in a region of the elastic ball joint (5), and the device:
   (a) comprises a torsion lever (2.1) which is installed perpendicular to the pendulum rod (2) or the pendulum cable (14) and has a pitch elastic torsion bearing for pitch movements (6) and a rotational elastic torsion bearing (7) for axial rotational movement of the pendulum rod or the pendulum cable, or
   (b) has at least three spring elements (8) which are distributed uniformly around the pendulum rod (2) or the pendulum cable (14) in a region of a pendulum joint and are arranged in such a way that torsional movement of the pendulum rod or the pendulum cable are damped or prevented, or
   (c) has at least three connecting rods (9) with elastic spherical bearings (9.1, 9.2) which are distributed uniformly around the pendulum rod (2) or the pendulum cable (14) in the region of the pendulum joint and are arranged in such a way that torsional movements of the pendulum rod or the pendulum cable are damped or prevented, or
   (d) has a pendulum yoke (2.2) with elastic stop elements (10) in the region of the pendulum joint and arranged in such a way that torsional pendulum movement is damped or prevented, or
   (e) has a combination of (b) and (d), or of (c) and (d); and
   (iii) the ball joint (5) has regions between the at least one elastomer layer (5.1) and the joint head (5.4) and/or the joint socket (5.5) or within the at least one elastomer layer (5.1) which allow a fluid (5.6) to be injected into these regions, via a filling valve, so that consequently locally different torsional stiffnesses exist with constant axial stiffnesses, or
   (iv) the at least one elastomer layer (5.1) has a different stiffness, between the joint head and the joint socket, in an axial direction of the ball/pendulum bearing than in a horizontal direction.

12. The pendulum vibration absorber according to claim 11, wherein the pendulum vibration has at least one additional device for damping occurring vibration, and the at least one additional device is one of a hydraulic damper, an eddy current damper a mechanical or a hydraulic temperature-independent damper.

* * * * *